Patented Dec. 25, 1928.

1,696,358

UNITED STATES PATENT OFFICE.

WOLF JOHANNES MÜLLER, HANS CARSTENS, AND JULIUS DRUCKER, OF LEVERKUSEN, NEAR COLOGNE-ON-THE-RHINE, GERMANY, ASSIGNORS TO I. G. FARBENINDUSTRIE AKTIENGESELLSCHAFT, OF FRANKFORT-ON-THE-MAIN, GERMANY.

PROCESS FOR THE EXTRACTION AND DRYING OF JELLIES.

No Drawing. Application filed August 17, 1926, Serial No. 129,862, and in Germany November 2, 1925.

The extraction and drying of inorganic jellies like silicic acid gel, which in the undried state form highly voluminous masses involve considerable difficulties when quantities such as are used in commercial processes are concerned, especially when it is necessary to obtain the dried jelly in grains of specific size. Such jellies are naturally extraordinarily sensitive towards mechanical treatment and where it happens that they are moved during the extraction and drying, whether by shovelling, stirring, etc., considerable waste is occasioned due to the production of small sized material.

According to the present invention these difficulties are avoided provided the jellies are caused to undergo the extraction and drying processes in the form of sheets or comparatively thin plates. The process may be carried out for example by the use of a chamber of say rectangular cross section, provided if desired with means for heating and in which alternately frames and plates of the same cross section are inserted. The hollow spaces, which are respectively produced by one frame and two plates, are filled with the liquid to be converted into the jelly, as for example silicic acid sol. As soon as this liquid has set the intermediate plates are withdrawn and the vessels are filled with a suitable wash liquid, such as water; this washing operation may be repeated until the jelly has attained to the requisite degree of purity. Obviously the extraction may also be carried out using a continuous flow of wash liquid. When several such vessels are connected in series the wash liquor can be systematically led from one vessel into another and thus be completely utilized. Another modification of the process consists in placing the frames containing the jelly alternatively with wash plates in a filter press suitably modified for the purpose and in carrying out the washing operation in such an apparatus. After the extraction is considered to be sufficient the frames are transferred and subjected to the drying process.

In order to render the layers of jelly satisfactorily strong and easy to manipulate the frames may with advantage be provided on one or both sides or also in the centre with lattice work or be otherwise suitably partitioned. In this case there is the incidental advantage that during drying the plates or sheets of jelly separate into pieces, corresponding to the width of the spaces of the lattice; consequently according to the choice of a suitably spaced lattice any required size of grain can be obtained with perfect ease.

We claim:

1. A process for extracting and drying inorganic jellies which comprises subjecting the jellies to the extraction and drying processes in the form of plates or sheets.

2. A process for extracting and drying silicic acid gel which comprises subjecting the gel to the extraction and drying processes in the form of plates or sheets.

3. A process for extracting and drying inorganic jellies which comprises subjecting the jellies to the extraction and drying processes in the form of plates or sheets supported by lattice work.

4. A process for extracting and drying silicic acid gel which comprises subjecting the gel to the extraction and drying processes in the form of plates or sheets supported by lattice work.

In testimony whereof we have hereunto set our hands.

WOLF JOHANNES MÜLLER.
HANS CARSTENS.
JULIUS DRUCKER.